(12) United States Patent
Nordin et al.

(10) Patent No.: US 10,889,450 B2
(45) Date of Patent: Jan. 12, 2021

(54) DEVICE FOR ALIGNING A NUMBER OF PACKAGES

(71) Applicant: Tetra Laval Holdings & Finance S.A., Pully (CH)

(72) Inventors: Joel Nordin, Löddeköpinge (SE); Staffan Lindén, Klippan (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/470,153

(22) PCT Filed: Dec. 4, 2017

(86) PCT No.: PCT/EP2017/081406
§ 371 (c)(1),
(2) Date: Jun. 14, 2019

(87) PCT Pub. No.: WO2018/114311
PCT Pub. Date: Jun. 28, 2018

(65) Prior Publication Data
US 2019/0359431 A1 Nov. 28, 2019

(30) Foreign Application Priority Data
Dec. 21, 2016 (EP) .................................... 16205927

(51) Int. Cl.
*B65G 47/28* (2006.01)
*B65G 47/76* (2006.01)
(Continued)

(52) U.S. Cl.
CPC .......... *B65G 47/2445* (2013.01); *B65B 61/00* (2013.01); *B65G 47/26* (2013.01);
(Continued)

(58) Field of Classification Search
None
See application file for complete search history.

(56) References Cited

U.S. PATENT DOCUMENTS

| 2,813,617 A | 11/1957 | Sheetz |
| 3,193,080 A | 7/1965 | Speaker |

(Continued)

FOREIGN PATENT DOCUMENTS

| CN | 201553478 U | 8/2010 |
| EP | 1655246 B1 | 5/2006 |

(Continued)

OTHER PUBLICATIONS

Search Report and Written Opinion in International Application No. PCT/EP2017/081406, dated Feb. 21, 2018, in 17 pages.

(Continued)

*Primary Examiner* — Kavel Singh
(74) *Attorney, Agent, or Firm* — Knobbe, Martens, Olson & Bear, LLP

(57) ABSTRACT

The present disclosure is related to a device for aligning a number of packages including at least one bottom belt. In some embodiments, the at least one bottom belt may include a first end portion for receiving packages and a second end portion for exiting packages. In some embodiments, said at least one bottom belt may include a laterally declined portion facing a support surface arranged along a side of the at least one bottom belt, whereby in use, packages conveyed by the at least one bottom belt move laterally towards the support surface for alignment thereto due to the laterally declined portion and by means of gravity.

7 Claims, 5 Drawing Sheets

(51) Int. Cl.
  *B65G 47/71* (2006.01)
  *B65G 47/26* (2006.01)
  *B65G 47/31* (2006.01)
  *B65G 39/00* (2006.01)
  *B65G 47/244* (2006.01)
  *B65B 61/00* (2006.01)
  *B65G 47/256* (2006.01)

(52) U.S. Cl.
  CPC .......... *B65G 47/256* (2013.01); *B65G 47/71* (2013.01); *B65G 47/763* (2013.01)

(56) References Cited

U.S. PATENT DOCUMENTS

| | | | |
|---|---|---|---|
| 3,722,659 A | 3/1973 | Aidlin et al. | |
| 5,551,551 A * | 9/1996 | Crawford | B65G 47/682 |
| | | | 198/448 |
| 5,701,989 A * | 12/1997 | Boone | B65G 47/682 |
| | | | 198/443 |
| 6,186,312 B1 | 2/2001 | Schererz | |
| 6,622,847 B2 * | 9/2003 | Schuitema | B65G 47/5145 |
| | | | 198/370.09 |
| 6,907,981 B2 * | 6/2005 | Williamson | B65B 1/22 |
| | | | 198/459.1 |
| 8,657,103 B2 | 2/2014 | Herrmann et al. | |
| 9,085,422 B2 * | 7/2015 | Cristoforetti | B65G 47/268 |
| 9,452,449 B2 * | 9/2016 | Schroader | B65G 13/00 |
| 9,533,836 B2 * | 1/2017 | Cristoforetti | B65G 47/682 |
| 2004/0050663 A1 | 3/2004 | Ford et al. | |

FOREIGN PATENT DOCUMENTS

| | | |
|---|---|---|
| EP | 1688376 A1 | 8/2006 |
| EP | 1882651 A1 | 1/2008 |
| FR | 1395855 A | 4/1965 |
| GB | 769133 A | 2/1957 |
| GB | 2263264 A | 7/1993 |
| JP | S63-306122 A | 12/1988 |
| JP | 2011-037620 A | 2/2011 |
| WO | WO2014/154623 | 10/2014 |

OTHER PUBLICATIONS

Search Report in European Application No. 16205927.3, dated Aug. 30, 2017, in 19 pages.

\* cited by examiner

DEVICE FOR ALIGNING A NUMBER OF PACKAGES

FIELD OF THE INVENTION

The present invention relates to a device for aligning packages for subsequent processing. More particularly, the device relates to a package aligner for aligning filled packages for subsequent processing.

BACKGROUND OF THE INVENTION

Irregular tetrahedral packages have been suggested by the present applicant e.g. in WO2014/154623. In short, the irregular tetrahedral packages are produced from a tube of packaging material, preferably being configured to enclose a liquid food product. The tube is formed by reforming a flat web of packaging material to a cylindrical tube, filling the tube with a product, and transversally sealing and cutting the tube, at regular intervals, into separate packages.

For this type of packages, and as is described in the above-mentioned prior art reference, the transversal seals are provided by two separate pairs of sealing jaws. These pair of sealing jaws, operating perpendicularly relative each other in a common plane, are tilted slightly such that the transversal seals are provided at an angle relative the horizontal plane. The purpose of having the sealing jaw pairs angled relative the horizontal plane is to produce two types of irregular tetrahedral packages in an alternating manner, where one package is a mirror image of its immediately upstream and downstream package. By combining six packages, three of each type, it has been proven possible to arrange all six packages in the shape of a rectangular box, i.e. a six-face shape of which all faces are a rectangle, and of which each pair of adjacent faces meets at a right angle.

As is evident, these types of packages may be stored and transported extremely efficient as the packages fill almost the entire space within the rectangular box.

However, in order to efficiently store such packages, it is critical to know the type of each individual package before storing. The visual similarities between different package types also make it more difficult to identify the type of each package. Hence, an improved device for identification of a type of a particular package would be advantageous.

SUMMARY OF THE INVENTION

An object of the present invention is to provide a device allowing for improved identification of the type of a particular package. This is achieved by a device for aligning packages using at least one bottom belt for supporting and transporting the packages, and a support surface onto which the respective packages are aligned. The at least one bottom belt comprises a declined portion and/or is tilted such as to allow packages to move laterally towards the support surface while being conveyed.

According to an aspect a device for aligning a number of packages is provided. The device comprises at least one bottom belt for receiving packages at a first end portion and exiting packages at a second end portion, wherein said bottom belt comprises a laterally declined portion facing a support surface arranged along a side of one of the bottom belts. In use packages conveyed by the bottom belts move laterally towards the support surface for alignment thereto due to the declined portion and by means of gravity.

A respective top surface of the at least one bottom belt at the position of the first end portion and/or second end portion may be horizontally aligned.

The bottom belt may further comprise an intermediate portion arranged between said first end portion and said second end portion, and said laterally declined portion may be formed by a top surface of said intermediate portion.

The device may further comprise a vibration roller being in contact with at least one of the bottom belts for creating vibrations in the associated bottom belt carrying packages.

The vibration roller may be a cylindrical roller having at least one flattened exterior surface in connection to at least one of the bottom belts creating a vibration in the associated bottom belt while rotating.

The support surface may be a support wall and/or a support belt.

A conveying speed of the support belt may be set higher than a corresponding conveying speed of the at least one bottom belt.

The conveying speed of the support belt may be set with a speed factor in relation to the conveying speed of the at least one bottom belt. As an example, the conveying speed of the support belt may be in the range between 1.0 and 1.5 times the conveying speed of the at least one bottom belt.

A conveying speed of a first bottom belt of the least one bottom belt may be set higher than a corresponding conveying speed of a second bottom belt of the at least one bottom belt.

The conveying speed of each bottom belt may be set such that the closer the at least one bottom belt is to the support surface, the higher the conveying speed is for that bottom belt such that a rotation of the package is achieved.

According to a second aspect, a divider device is provided. The divider device comprises an elongated guide member arranged downstream a conveyor belt, wherein the elongated guide member is laterally positioned in relation to the conveyor belt such as to allow a package of a first type having a center of mass at a first lateral position to slide and tilt over to a first side of the guide member, and a package of a second type having a center of mass at a second lateral position to slide and tilt over to a second side of the guide member, wherein the guide member comprises a width which is at least extending between a first longitudinal line intersecting the first lateral position of the first type and a second longitudinal line intersecting the second lateral position of the second type.

The elongated guide member may have a triangular cross section along its longitudinal extension which gradually changes into a rectangular cross section towards a downstream end of the elongated guide member.

In an example a first conveyor belt is provided at along a first side of the elongated guide member and a second conveyor belt is provided along a second side of the elongated guide member.

In an example the first conveyor belt and the second conveyor belt are tilted relative to the elongated guide member such that a pocket for the packages to fall in and being conveyed on are created.

The first bottom belt and the second bottom belt may be driven at different speeds such as to allow packages to exit said bottom belts alongside each other.

The elongated guide member may have a longitudinally extending top surface having an increasing width along its extension such that the packages are laterally guided away from each other along the extension of the elongated guide member.

The device may further comprise a device for aligning a number of packages according to the first aspect arranged upstream said elongated guide member.

According to a third aspect, a method for aligning a number of packages in a conveyor system comprising at least one bottom belt is provided. The method comprises receiving packages at a first end portion of at least one bottom belt, aligning the packages by means of at least an intermediate portion of the at least one bottom belt being declined against a support surface such that during transporting the packages conveyed by the bottom belts in the intermediate portion move laterally towards the support surface for alignment thereto due to the declined portion and by means of gravity.

The step of aligning may comprise applying a vibration using a vibration roller to the at least one bottom belt carrying packages.

The method may further comprise providing an elongated guide member downstream a second end portion of the at least one bottom belt, said elongated guide member being laterally positioned in relation to the bottom belt, wherein the guide member comprises a width which is at least extending between a first longitudinal line intersecting a first lateral position of a first type of packages and a second longitudinal line intersecting a second lateral position of a second type of packages, wherein the method further comprises operating the at least one bottom belt thereby transporting aligned packages onto the elongated guide member such that a package of the first type having a center of mass at the first lateral position to slide and tilt over to a first side of the guide member, and a package of the second type having a center of mass at the second lateral position to slide and tilt over to a second side of the guide member.

BRIEF DESCRIPTION OF THE DRAWINGS

The description of the invention will be more easily understood when read together with the accompanying drawings, in which FIG. 1 schematically shows a device for aligning packages using a bottom belt forming one or more bottom belts for supporting and transporting packages.

DETAILED DESCRIPTION

Figure 1:
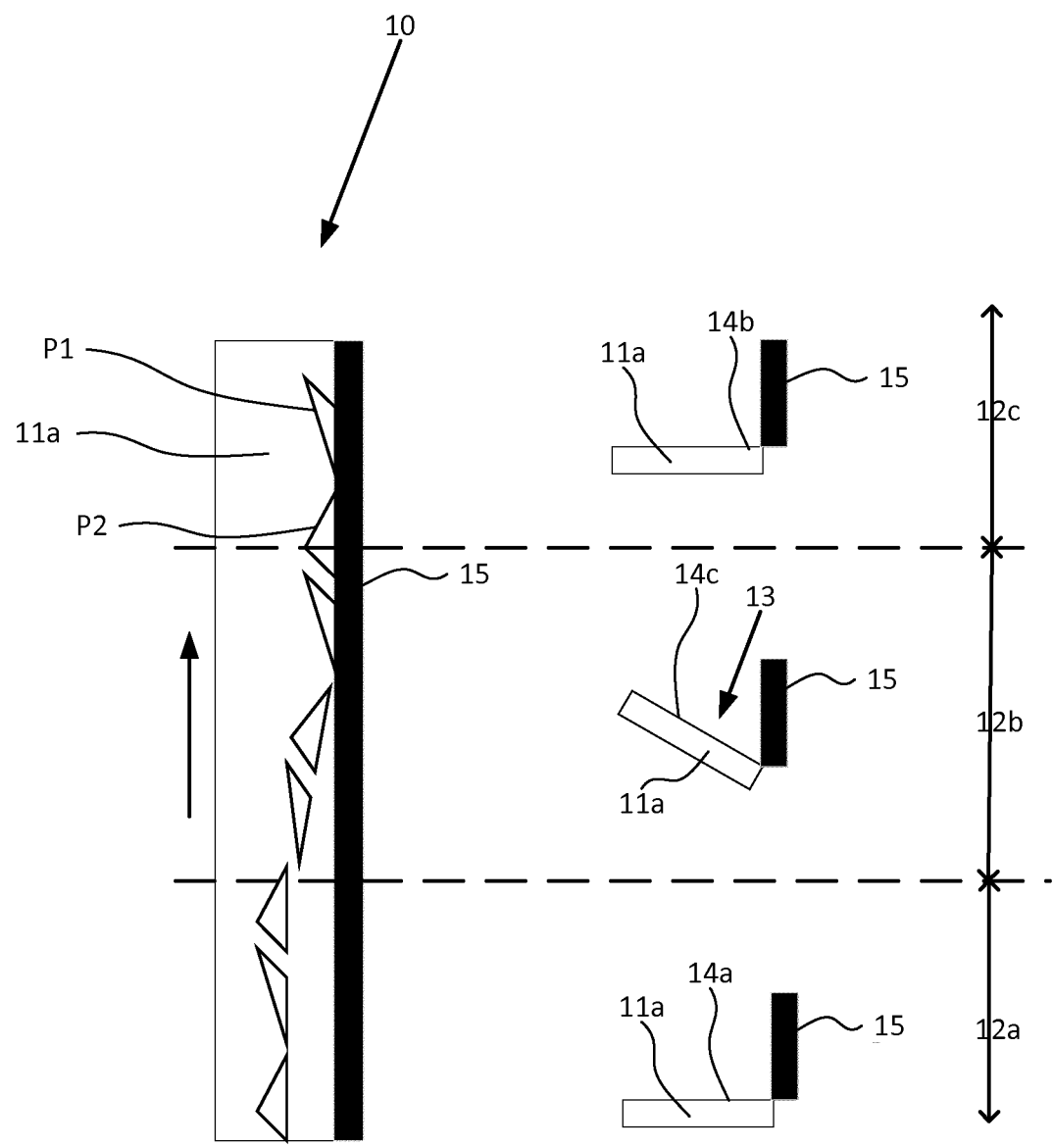

FIG. 1 schematically shows a device 10 for aligning a number of packages P1, P2. The left side of FIG. 1 illustrates a top view of the device, whereas the right side of FIG. 1 shows three cross-sectional views of the device along the longitudinal extension of the device.

The device 10 comprises at least one bottom belt 11a for receiving packages P1, P2 at a first end portion 12a and exiting packages P1, P2 at a second end portion 12c. The at least one bottom belt 11a forms one or more bottom belts for supporting and transporting the packages P1, P2. A respective top surface 14a, 14b of the at least one bottom belt 11a at the position of the first end portion 12a and second end portion 12c may be horizontally aligned. This means that bottom belt(s) at the first end portion 12a and the second end portion 12c may be essentially flat for facilitated package handling processing. An intermediate portion 12b is arranged between the first end portion 12a and the second end portion 12c. At the intermediate portion 12b the respective top surface 14c of the at least one bottom belt forms a laterally declined portion 13 facing a support surface 15 arranged longitudinally along a side of the bottom belts 11a. The declined portion 13 thus forms a tilted plane onto which the packages P1, P2 may slide toward the lower level thereof. Accordingly, in use the packages P1, P2 conveyed by the at least one bottom belt 11a in the intermediate portion 12b move laterally towards the support surface 15 for alignment thereto as a consequence of the declined portion 13 and by means of gravity. The arrow in FIG. 1 indicates the forward direction of travel of the bottom belt 11a.

Figure 2:
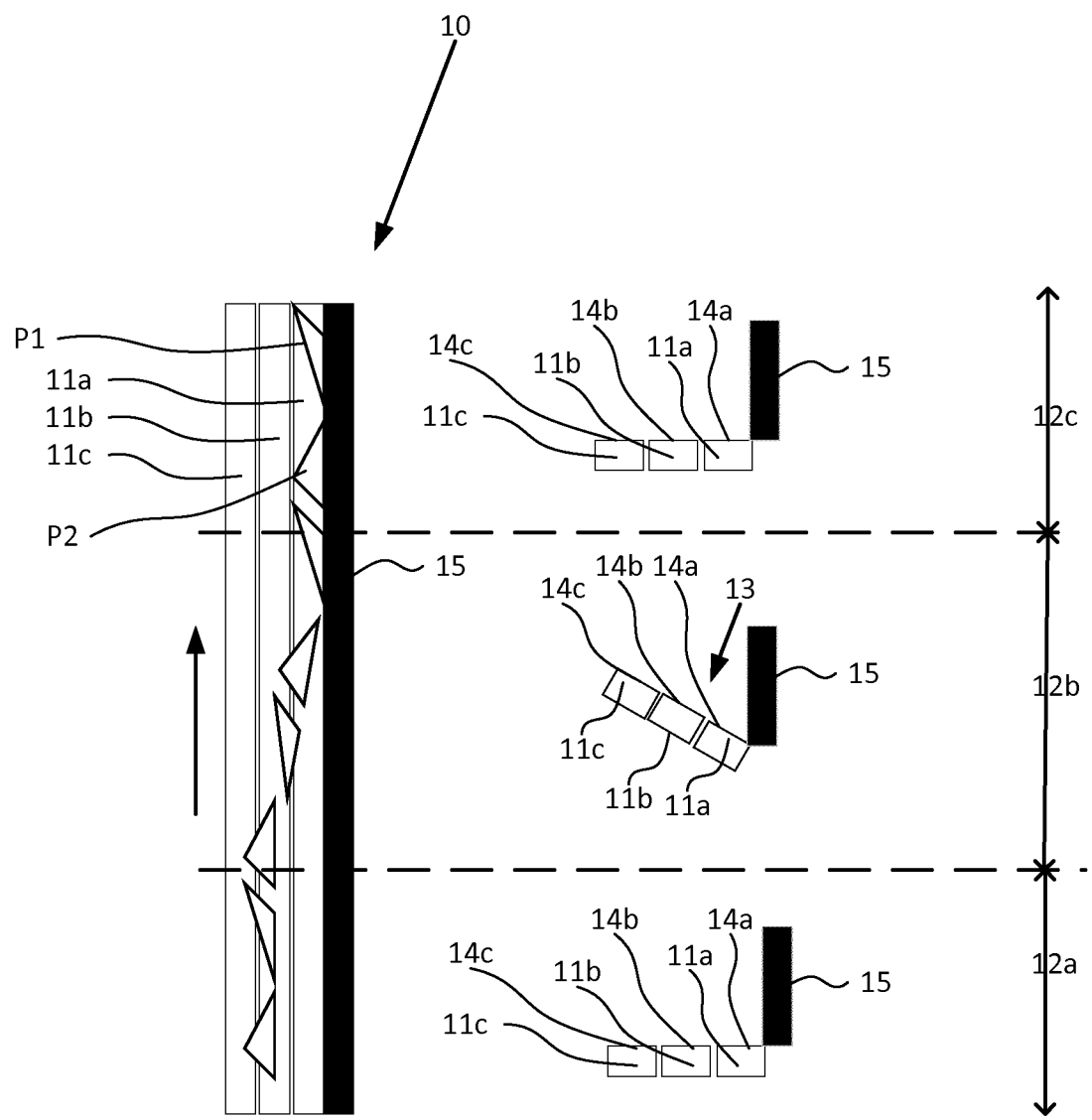
FIG. 2 schematically shows a device for aligning packages having more than one bottom belt.

FIG. 2 shows the device of FIG. 1 with two additional bottom belts 11b, 11c. The bottom belts 11a-c are arranged side-by-side. It should be appreciated that any number of the bottom belts could be used. Similarly to FIG. 1, the arrow indicates the forward direction of travel of the bottom belt. Preferably, the width of each bottom belt 11a-c is less than the maximum width of the package P1, P2.

A vibration roller 21, as shown with reference to FIGS. 3 to 6, may be arranged to be in contact with at least one of the bottom belts 11a, 11b, 11c for creating vibrations in the associated bottom belt, thereby reducing the effect of friction between the packages and the respective bottom belt especially in the intermediate portion 12b. This allows for the packages P1, P2 to move laterally more easily towards the support surface 15 as the packages shakes laterally towards the support surface 15.

Figure 3:
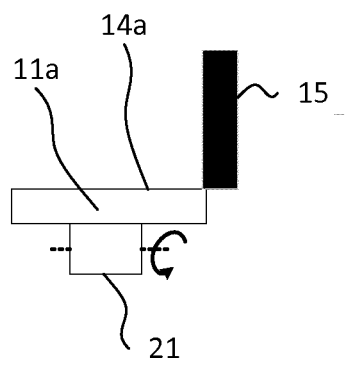
FIG. 3 shows a cross-section of the device of FIG. 1 provided with a vibration roller.
Figure 4:
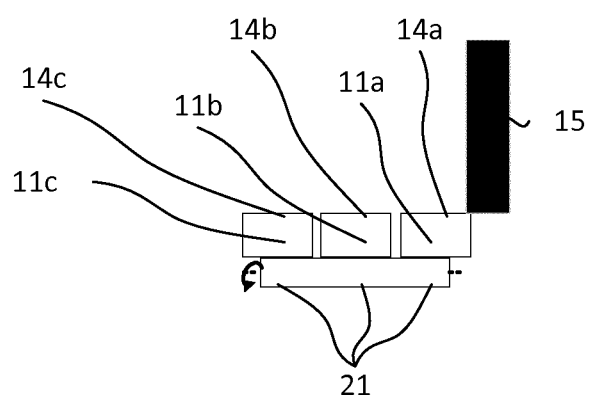
FIG. 4 shows a cross-section of the device of FIG. 2 provided with a vibration roller.

FIG. 3 show a vibration roller 21 provided below and operatively coupled to the single bottom belt 11a, whereas FIG. 4 show a vibration roller 21 provided below each bottom belt 11a, 11b, 11c, such that the vibration roller 21 extends across the complete width of the bottom belts 11a, 11b, 11c. Optionally, any number of vibration rollers 21 could be arranged along the extension of each bottom belt 11a-c. Preferably, the vibration roller(s) 21 is arranged at the declined portion 13.

Figure 5:
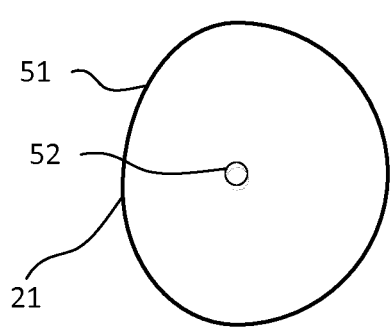
FIGS. 5 and 6 respectively show a cross section of a vibration roller.
Figure 6:
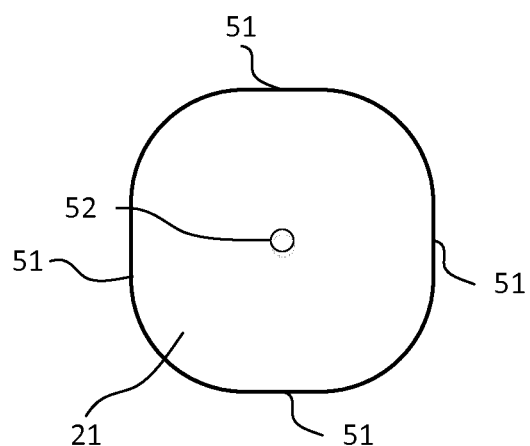

FIGS. 5 and 6 show two alternative cross-sectional views of the vibration roller 21. A key aspect of the vibration roller 21 is to have it arranged such that its radius from its rotation axis 52 to the outer surface 51, to which the bottom belt is operatively coupled, changes during one revolution. Hence, the vibration roller 21 may have the semi-circular cross-sectional shape as shown in FIG. 5 with a flattened section at one side thereof. FIG. 6 shows a different version of a semi-circular vibration roller 21 having straight outer section 51 shapes spaced apart equidistantly. In one example the roller 21 comprises a plurality of flattened or irregular areas for providing vibration.

However, it should be appreciated that the cross-sectional shape of the vibration roller 21 could be circular by offsetting the rotation axis from the center position to a radial position, whereby upon rotation of the vibration roller 21 the radius from the rotation axis 52 to the outer surface 51 would change over each revolution.

The vibration roller could have a cylindrical extension thereby forming a cylindrical roller.

Figure 7:
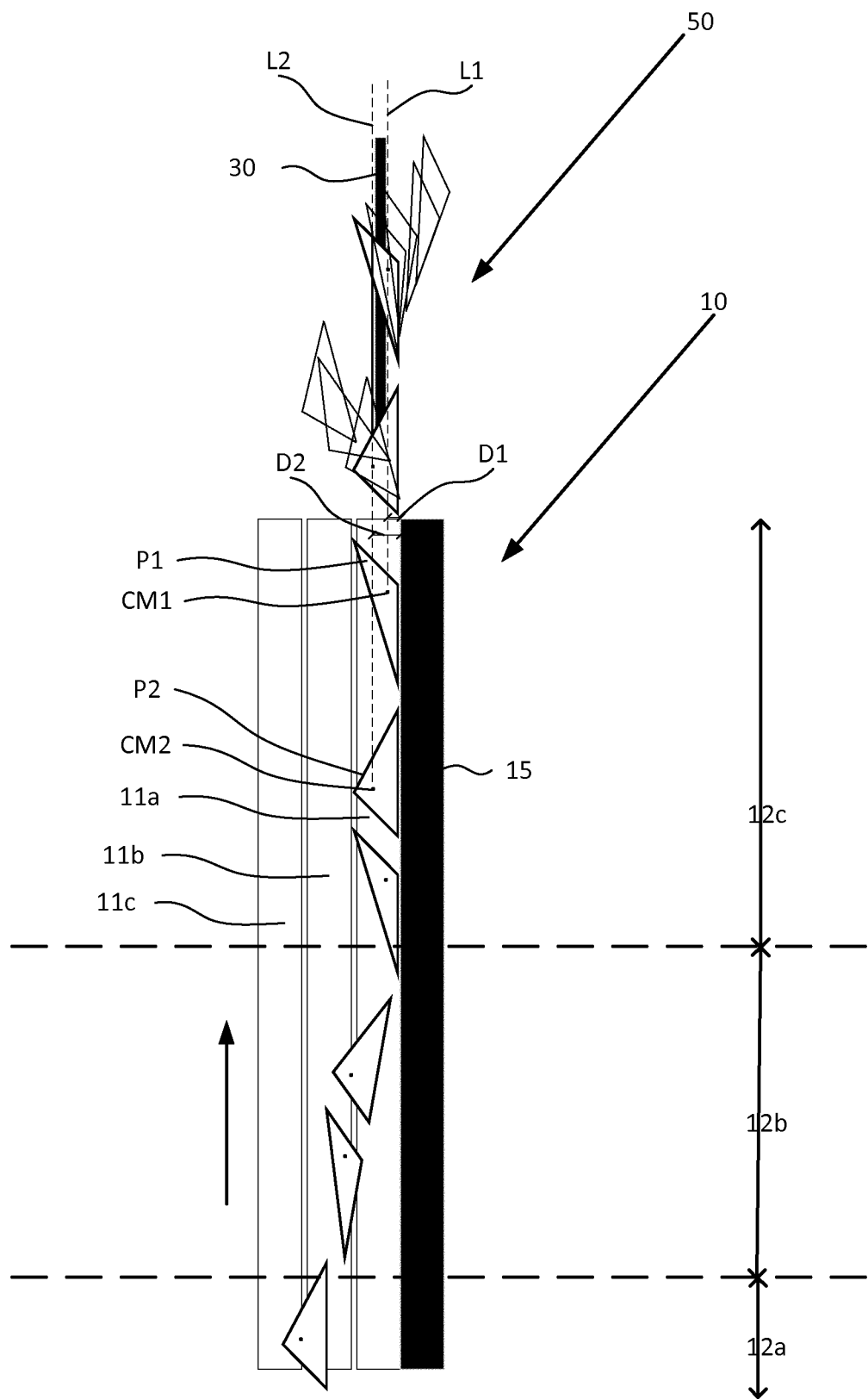
FIG. 7 schematically shows the device of FIG. 2 being provided with an elongated guide member.

The support surface 15 may be a support wall, as shown in FIGS. 1, 2 and 7 for receiving and aligning packages P1, P2 upon their lateral movement in the intermediate portion 12b.

Alternatively or in combination, the support surface 15 may comprise a support bottom belt having the same forward direction of travel as the bottom belts 11a, 11b, 11c. Hence, the support bottom belt 15 could have a top surface faced at an angle of equal or less than 90 degrees in relation to the top surface(s) 14a, 14b, 14c of at least one of the bottom belts 11a, 11b, 11c.

In an example, the support belt 15 and the bottom belt 11a may be the same bottom belt.

In an example, the conveying speed of the support belt 15 is set higher than a corresponding conveying speed of the at least one bottom belt 11a, 11b, 11c. This improves the desired lateral movement of each package since the package tends to laterally move towards the bottom belt having the higher relative speed. In this way, the higher speed bottom belt will pull the package from the lower speed bottom belt when coming into contact with the package.

The conveying speed of the support belt 15 may be set with a speed factor in relation to the conveying speed of the at least one bottom belt 11a, 11b, 11c. As an example, the conveying speed of the support belt 15 may be in the range between 1.0 and 1.5 times the conveying speed of the at least one bottom belt 11a, 11b, 11c.

The conveying speed of a first bottom belt 11a of the least one bottom belt may be set higher than a corresponding conveying speed of a second bottom belt 11b of the at least one bottom belt, such as to facilitate the lateral movement of the package P1, P2 from the second bottom belt 11b to the first bottom belt 11a. This also allows for providing rotation of the packages as well so that they are aligned towards the support surface 15.

In an example, a divider device 50 is arranged to receive and sort packages of two types, P1, and P2 respectively, each type being a mirrored version of the other. A first type P1 will have a center of mass CM1 at a first position therein, whereas the second type P2 will have a center of mass CM2 at a second position therein. When aligned against the support surface 15, the package type P1 will have a center of mass CM1 at a first lateral distance D1 from the support surface whereas the package type P2 will have a center of mass CM2 at a second lateral distance D2 from the support surface, illustrated in FIG. 7. The center of mass of the packages can be for example at the centre of the package or off-center of the package. The divider device 50 is arranged downstream the device 10 for aligning the packages P1, P2. Thereby the center of mass of the respective packages P1, P2 will coincide with longitudinally extending axes when the packages P1, P2 reaches the end section of the device 10.

With reference to FIG. 7, the divider device 50 comprises an elongated guide member 30 which is longitudinally arranged downstream the second end portion 12c for separating two different packages P1 and P2 carried on the bottom belt(s) 11a, 11b, 11c. The guide member 30 has a width which is at least as wide as the first lateral center of mass distance D1 and the second lateral center of mass position D2. Hence, the guide member has a width which is at least extending between a first longitudinal line intersecting the first lateral position, i.e. the center of mass CM1 of the first type of package P1 and a second longitudinal line intersecting the second lateral position, i.e. the center of mass CM2 of the second type of package P2. In this way an aligned package of a first type P1 having a center of mass CM1 at the first lateral position D1 is allowed to slide and tilt over to a first side of the guide member 30, whereas an aligned package of a second type P2 having a center of mass CM2 at the second lateral position D2 is allows to slide and tilt over to an opposite side of the guide member 30.

Accordingly, the width of the guide member 30 is located between a first longitudinal line L1 intersecting the first lateral center of mass position D1 and a second longitudinal line L2 intersecting the second lateral center of mass position D2, as shown in FIG. 7.

The dotted package lines in FIG. 7 illustrates the process of each package type P1, P2 tilting over to the respective side of the guide member based on their lateral center of mass position. On each side of the elongated guide member 30, separate bottom belts may be provided for transporting the separated packages P1, P2 to downstream equipment such as packing and storing stations.

It should be appreciated that the provision of an elongated guide member 30 is not dependent or limited to any particular number of bottom belts arranged in the device. Accordingly, an elongated guide member 30 may also provided to the device 50 of FIG. 1 having a single bottom belt 11a.

Figure 8:
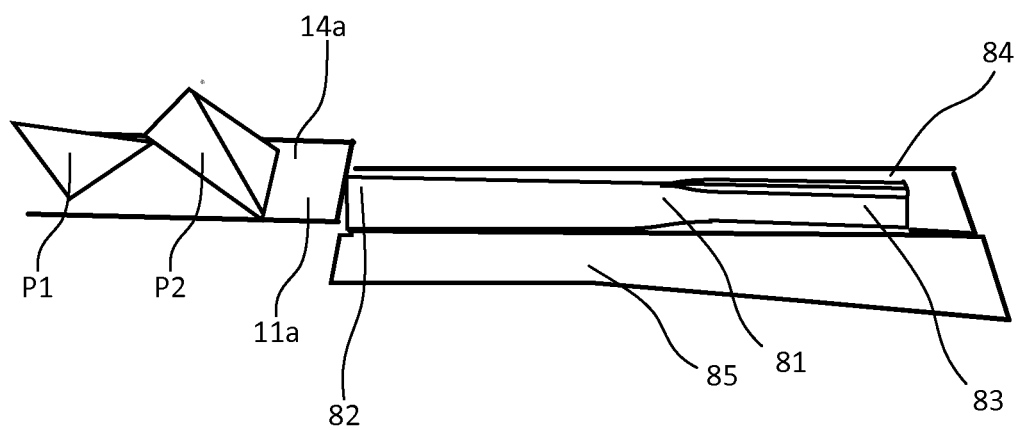
FIG. 8 schematically shows the device of FIG. 2 being provided with an alternative elongated guide member.

FIG. 8 illustrates an example of the device 50 comprising an elongated guide member 81. The elongated guide member 81 is positioned (e.g. laterally and in height) similarly to the elongated guide member of FIG. 7. As may be observed from FIG. 8 the packages arrive at the elongated guide member 81 with one of their sealed edges laying on the top surface 14a of the bottom belt 11a facing in the forward direction. Similarly to the example of FIG. 7, the packages P1,P2 are aligned against the support surface 15, and arrive at the elongated guide member 81 in sequence, one after the other, such that a package of a first type P1 is followed by a package of a second type P2, which is followed by a package of a first type P1 and so on. Similarly to the elongated guide member of FIG. 7, the elongated guide member 81 of FIG. 8 also functions as to separate packages of a first type P1 to one side of the elongated guide member 81 and packages of a second type P2 to the other side of the guide member 81. The receiving end 82 of the elongated guide member 81 has a triangular cross section along its longitudinal extension. This triangular cross section gradually changes into a rectangular cross section towards a downstream end 83 of the elongated guide member 81. On either side of the elongated guide member 81 is provided a bottom belt 84 and 85. Due to the packages center of mass position CM1, CM2, each package will either fall onto the bottom belt 84 or bottom belt 85. As seen in FIG. 8, the packages of the first type P1 having a center of mass position CM1, will fall onto the bottom belt 85, whereas the packages of the second type and having a center of mass position CM2 will fall onto the bottom belt 84. The bottom belts 84 and 85 may be arranged such that their respective top surfaces form a 90 degree angle in relation to the triangular side surfaces of the elongated guide member 81. This reduces the risk of the packages to fall of the associated belt(s) 84, 85 when falling over the upper ridge of the elongated guide member 81, while providing better stability to the packages.

In an example, the belts 84, 85 are tilted relative to the guide member 81 or 30 such that they form a pocket for catching the package P1,P2 when being tilted on to the belt 84 or 85. The conveyor belts 84, 85 thus form pockets for the packages P1, P2 to fall in and being conveyed on. This will align the packages P1, P2 to one of their sides but also prevent any over rotation of the packages P1, P2 so that they slide of any belt. It also allows for smother transition for the package P1, P2 when being tilted by guide member 30 or 81 on to the belts 84, 85 so that it will fall on a large side instead of on any edge of the package. In an example the guide member 81 or a part of the guide member and the belts 84, 85 are tilted in a complementary way to even further create a smooth transition between the two.

The triangular shaped cross section in the receiving end of the elongated guide member 81, in conjunction with the respective bottom belt 84, 85 will result in a tilting motion of the respective package P1, P2. This mean that the forward seal edges of each package which originally lay flat onto the bottom belt 11a will be tilted and attain a standing posture, i.e. not laying flat against the respective bottom belt 84, 85. The top surfaces of the bottom belts 84, 85 may gradually tilt towards a horizontal plane along the extension of the elongated guide member 81. Since the longitudinal cross section of the elongated guide member 81 changes from a triangular shape towards a rectangular shape along its extension, this means that the top surfaces of the respective bottom belt 84, 85 may remain in an essentially 90 degree angle in relation to the side surfaces of the elongated guide member 81.

A reason for driving the bottom belts 84 and 85 at different speeds is to allow for the possibility of letting a package of a first type P1 to exit the bottom belt 85 alongside a package of a second type P2 being conveyed at bottom belt 84. This grouping of packages of different types into pairs alongside each other has shown to improve the subsequent packaging process.

Figure 9:
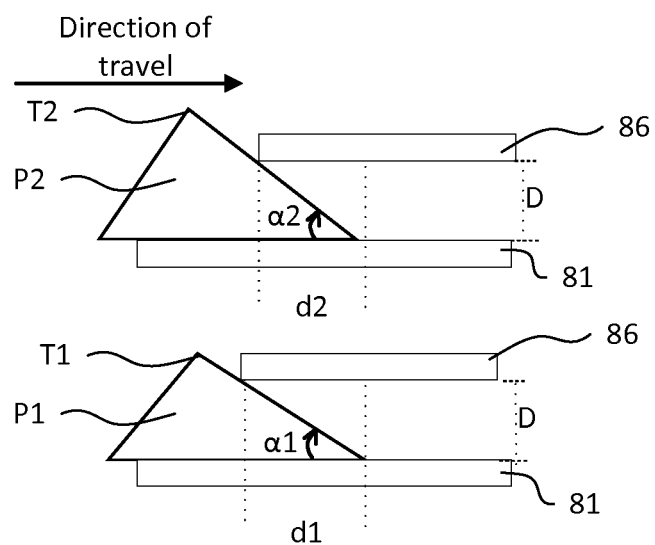
FIG. 9 shows a side view of two packages of different types and their respective inclination angles, having an impact on the engagement to a top guide member.

In addition to the elongated guide member 81, a top guide member 86 may be provided at a distance D above the elongated guide member 81. The purpose of the top guide member 86 is to facilitate for packages of the first and second type P1, P2 to controllably fall onto the bottom belt 84, 85. The lateral cross section of the packages of a second type P2 has a steeper incline α2 towards its top portion T2 than the packages of the first type P1, as may be seen in FIG. 9. From FIG. 9 it may be observed that the incline α1 of the first package type P1 is less than α2, which means that the package of a first type will travel a distance d1 onto the elongated guide member 81 before encountering the top guide member 86, wherein the distance d1 is longer than the corresponding distance d2 that the package of the second type may travel before encountering the top guide member 86. When a package of the first type P1 approaches the divider device, including the guide member 81 and the top guide member 86, the upper portion of the package P1 will come into contact with the top guide member 86. If the center of mass CM1 of the package P1 is located such that the package P1 will fall onto the conveyor belt 85, the top guide member 86 will assist in such fall. This is due to the fact that the top guide member 86 is having an increasing width such that the extension of the top guide member 86 across the width of the conveyor belt 85 is increasing along the longitudinal direction. Hence, the center of mass CM1 of the first type of package P1 can be extremely close to the center of the elongated guide member 81, but due to the provision of the top guide member 86 the package P1 must fall onto the conveyor belt 85.

The consecutive package, being of the second type P2, will have its center of mass CM2 on the other side of the elongated guide member 81. Even if the upper portion of the package P2 engages with the top guide member 86, the package P2 will be allowed to fall onto the conveyor belt 84 immediately when it exits the conveyor belt 11a.

The purpose of the top guide member 86 is thus to ensure that a package P1, having its center of mass CM1 very close to the midpoint of the elongated guide member 81, will be urged to fall onto the desired conveyor belt 85. This is achieved by allowing the upper portion of the package P1 to engage with the top guide member 86, which thereby prevents unintentional falling of the package P1 in the wrong direction.

As explained above the package divider 50 may comprise guiding members, 30, 81 or 86. In an example the height of the guide member 30, 81 or 86 is chosen such that the package slides on to it and tilts, and/or is elevated from the conveyor so that the package tilts. The height is preferably within the height of the package so that the guide member 30, 81 or 86 affects the direction of the package outwards so that it tilts over.

Although the above description has mainly been described with reference to a few examples, however, as is readily understood by a person skilled in the art, other examples than the ones disclosed above are equally possible within the scope of the invention, as defined by the appended claims.

The invention claimed is:

1. A method for aligning a number of irregular tetrahedral packages in a conveyor system comprising at least one bottom belt, the method comprising:
   receiving irregular tetrahedral packages at a first end portion of the at least one bottom belt;
   aligning the packages with at least an intermediate portion of the at least one bottom belt, the intermediate portion being declined against a support surface of the conveyor system such that during transporting, the packages conveyed by the at least one bottom belt in the intermediate portion move laterally towards the support surface for alignment thereto due to the declined intermediate portion and by means of gravity, wherein the aligned packages comprise a first type aligned with respect to the support surface in a first lateral position and a second type aligned with respect to the support surface in a second lateral position;
   providing an elongated guide member downstream a second end portion of the at least one bottom belt, said elongated guide member being laterally positioned in relation to the at least one bottom belt, wherein the elongated guide member comprises a width extending at least between a first longitudinal line intersecting a first center of mass of the first type of the packages in the first lateral position and a second longitudinal line intersecting a second center of mass of the second type of the packages in the second lateral position; and
   operating the at least one bottom belt to transport said packages onto the elongated guide member such that the first type of the packages aligned in the first lateral position slide and tilt over a first side of the elongated guide member and the second type of the packages aligned in the second lateral position slide and tilt over a second side of the elongated guide member, the second side of the elongated guide member being opposite the first side of the elongated guide member;
   wherein the first and second types of the packages are aligned in the first and second lateral positions such that forward sealed edges of the first and second types of the packages lay in a flat position on a top surface of the at least one bottom belt;

wherein a first conveyor belt is provided along the first side of the elongated guide member and a second conveyor belt is provided along the second side of the elongated guide member;

wherein the first and second conveyor belts are tilted relative to the elongated guide member to form pockets for catching and conveying the first and second types of the packages such that the forward sealed edges of the first and second types of the packages are tilted to a standing position; and wherein the first conveyor belt and the second conveyor belt are driven at different speeds to allow the first and second types of the packages to exit said first and second conveyor belts alongside each other for transporting the first and second types of the packages to downstream equipment.

2. The method of claim 1, wherein the step of aligning the packages further comprises:

applying a vibration, using a vibration roller, to the at least one bottom belt carrying the packages.

3. The method of claim 1, wherein the elongated guide member has a first end positioned adjacent to the second portion of the at least one bottom belt and a second end opposite the first end, and wherein the elongated guide member has a triangular cross section at the first end that gradually changes to a rectangular cross section towards the second end of the elongated guide member.

4. The method of claim 1, wherein adjacent ones of the aligned irregular tetrahedral packages are mirror images of one another.

5. The method of claim 1, wherein the first type of the packages are mirror images of the second type of the packages.

6. The method of claim 1, wherein the downstream equipment comprises a packing station.

7. The method of claim 1, wherein the downstream equipment comprises a storing station.

* * * * *